July 5, 1960
R. H. CLARK
2,943,952
METHOD OF MAKING DUPLICATING TRANSFER
SHEET AND RESULTANT ARTICLE
Filed Dec. 14, 1956
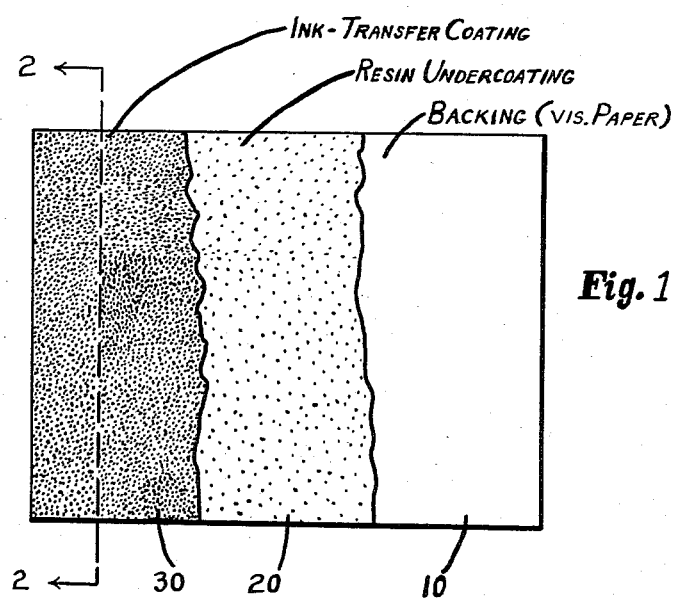
Fig. 1
Fig. 2
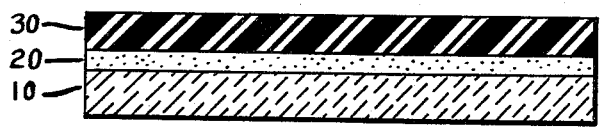
INVENTOR.
RALPH H. CLARK
BY
ATTORNEY

United States Patent Office
2,943,952
Patented July 5, 1960

2,943,952
METHOD OF MAKING DUPLICATING TRANSFER SHEET AND RESULTANT ARTICLE

Ralph H. Clark, Westwood, N.J., assignor to Burroughs Corporation, Detroit, Mich., a corporation of Michigan Filed Dec. 14, 1956, Ser. No. 628,312

4 Claims. (Cl. 117—36)

The present invention relates to novel duplicating media, such as "carbon" paper prepared with ink-transfer compositions of the synthetic resin type, and to methods of making same.

This application is a continuation-in-part of my earlier application Serial No. 598,753, filed July 19, 1956, disclosing improved synthetic resin types of ink-transfer compositions and duplicating media prepared therewith. The compositions of that application are best applied to the backing medium over an undercoating which may, pursuant to the present invention, be of the type disclosed in the present application.

The presently used resin types of ink-transfer compositions are generally characterized by having a base of a film-forming synthetic resin containing nonvolatile, non-drying liquid plasticizing oils and coloring matter. The plasticizing oils are sufficiently incompatible with the resin and present in sufficient quantity so that they migrate within the resin, and are caused to be exuded or expressed therefrom under an impact or writing pressure, carrying therewith the coloring matter which effects the ink-transfer. While such compositions may frequently be referred to herein as being "transfer" compositions or coatings, it will be understood that the film-forming resin does not transfer in any significant amounts under the pressure, but rather it is the oils and coloring matter carried by the resin which are caused to exude or to be "squeezed" from the resin base which transfer. This is to be distinguished from the wax type compositions of the conventional carbon paper in which the wax base as well as the coloring matter transfer to the copy surface under writing or impact pressure.

While the synthetic resin type of ink-transfer compositions have been known for many years, at least since 1932 as evidenced by Australian Patent No. 10,136 of 1932, it has only been in the past several years that such compositions have been successfully commercialized. These recent and earlier compositions are of the type to be prepared and coated on the backing medium in the form of a volatile solvent solution of the resin, the solvent being subsequently evaporated. My copending application Serial No. 598,753 discloses improved compositions of this type utilizing an acrylic resin, which compositions have improved transferability characteristics especially desirable for "typewriter" applications in that they are characterized by having less undesirable offsetting during use thereby producing neater and cleaner copies. As disclosed in that patent application, the compositions are best applied over an undercoating. This is preferable in order to obtain the desired adhesion of the ink-transfer coating to the paper backing, because of the presence of plasticizing oils exceeding their compatibility limits with the resin, and also to provide a barrier to prevent the oils carrying the coloring matter from seeping through the non-transferring surface of the backing medium.

The undercoatings heretofore used with the presently known compositions are also prepared and applied as solvent solutions of the resin. The resin undercoating, being soluble in the solvent of the ink-transfer coating, tends to dissolve therein when the latter coating is applied thus decreasing the barrier to oil seepage through the backing medium. This tends to shorten the useful life of the duplicating media. In addition, during storage or use the residual solvent that may be left in the undercoating migrates to the ink-transfer coating and then evaporates, thereby tending to change the transferability characteristics of the duplicating media particularly its intensity. Further, a solvent-applied coating tends to form a superficial film on the surface of the backing medium (usually paper), without substantial penetration into the paper, and thereby produces a tendency in the paper to curl. Moreover, in applying this undercoating, it is necessary to use expensive and explosion-proof equipment because of the hazards in evaporating the solvent of the undercoating. Also the solvent used in the undercoating is generally lost unless further expensive recovery equipment is utilized.

The present invention provides duplicating media which do not have the foregoing disadvantages and which are also less costly to produce, in that the undercoating is prepared and coated onto the backing medium (viz. paper) in the form of a fluid composition containing an insoluble resin and requiring no volatile ingredients. This coating, upon subsequent heating and cooling, is fused into the paper and is transformed into a solid state upon which the superimposed ink-transfer coating will readily adhere, and which also forms a barrier of a resin insoluble in the solvent of the ink-transfer coating, thereby minimizing the penetration of the ink into the backing medium and through the backing medium to its non-transferring surface. While another copending application Serial No. 628,215, filed December 14, 1956, discloses synthetic resin types of ink-transfer compositions which may be applied to the backing medium without any undercoating, the compositions of my copending application Serial No. 598,753 are presently more eminently suitable for certain applications, and such compositions are best applied by first utilizing an undercoating therefor.

An object of the present invention, therefore, is to provide improved duplicating media and methods of making same prepared with the synthetic resin types of ink-transfer coatings.

Another object of the invention is to provide such duplicating media with an undercoating that is insoluble in the solvent of the ink-transfer coating and therefore forms a better barrier against the ink migrating therethrough.

Another object of the invention is to provide duplicating media and method of making same which utilize an undercoating that requires no volatile ingredients in its preparation and application, and which media exhibit improved properties and are less costly to produce.

These and other objects and advantages, which will become apparent as the description proceeds, are attainable by the duplicating media and method of preparing same in accordance with the invention hereinafter described in connection with illustrative embodiments thereof.

Figs. 1 and 2 of the drawing illustrate a duplicating medium such as "carbon" paper prepared in accordance with the present invention and includes a backing medium 10, such as paper, an undercoating 20 with which this invention is primarily concerned, and an ink-transfer coating 30 preferably, but not necessarily, of the synthetic resin type disclosed in my copending application Serial No. 598,753. It will be appreciated that the thicknesses are not illustrated to scale and are slightly exaggerated for purposes of more clearly illustrating the coatings.

In the undercoating compositions of the present invention, the resin constituent, instead of being a soluble type dissolved in a solvent as in prior compositions, is preferably an insoluble resin suspended in the form of a finely-divided dispersion in organic liquid vehicles, such types of compositions being commonly called "organisols" or "plastisols." To avoid the use of evaporating equipment, all the organic liquid vehicles are preferably substantially nonvolatile, in which case such compositions are generally termed "plastisols." The liquid vehicles include a compatible solvent-type plasticizer for the resin which acts as a dispersant therefor at ordinary temperatures to reduce the composition to a substantially fluid state for coating on the paper backing. After the undercoating composition is applied to the paper backing, it is heated to the fusing temperature causing solvation of the dispersed resin particles by the plasticizer, and then cooled, whereupon the resin is converted to a solid state. Over the undercoating 20, so applied to the paper backing 10, is coated the ink-transfer composition 30 which, as mentioned above, is preferably of the type disclosed in my application Serial No. 598,753.

In the undercoating composition, the main resin constituent which is dispersed in the liquid vehicles is preferably of the vinyl chloride type, i.e. selected from the group consisting of vinyl polymers and copolymers relatively high in poly-vinyl chloride content, although blends with other resins, such as those containing a smaller proportion of vinyl chloride, may also be used. The preferred resins for the main resin constituent are polyvinyl chloride or copolymers of vinyl chloride and vinyl acetate containing 95–99% vinyl chloride. Minor proportion of copolyvinyl-chloride-acetate and copolyvinyl-chloride-vinylidene-chloride having a smaller proportion of vinyl chloride may be blended with the main resin. The resin constituent must be dispersed in a finely-divided form in order to obtain the necessary viscosity and flow characteristics for coating the composition on the paper backing 10. It is preferred to use a vinyl chloride resin produced according to known procedures of polymerizing the monomer in an aqueous emulsion which results in the fine particle size desired.

The compatible solvent-type plasticizers included in the organic liquid vehicles of the undercoating composition must be capable of wetting and dispersing the resin at ordinary room temperatures but must not swell or dissolve them under these conditions. At the fusion temperature, this plasticizer must become an active solvent for the resin to solvate the resin particles thereby producing a coherent film on cooling. Many of the common plasticizers for vinyl chloride resins may be used, illustrative examples thereof including di(2-ethylhexyl) adipate, di(2-ethylhexyl)phthalate, tetrabutyl thiodisuccinate, and mixtures thereof. The proportions of such plasticizers compared to the resin can be widely varied as is well known in the art, but the preferred ranges for the specific examples set forth below are from about ½ to 1½ parts by weight of the solvent-type plasticizer to one part of the vinyl resin.

It has also been found advantageous to include in the liquid vehicles of the undercoating composition a quantity of a liquid heat-polymerizable material which is compatible with, but which does not solvate, the vinyl resin at ordinary temperatures, and which polymerizes rapidly at the fusing temperature to form a resin blend with the vinyl resin. Methacrylate diesters of a liquid polyethylene glycol, which have been previously used in plastisols, have been found very suitable for this purpose, and may be included up to a preferred maximum of about one-fifth part by weight per part of the vinyl resin. Larger proportions are operable but merely increase the cost of the coating composition. Increasing the amount of this material tends to decrease the amount of the solvent-type plasticizer required.

The undercoating compositions may also include a minor amount of a heat stabilizer for the vinyl resin, such as dibasic lead phosphite. Other modifying ingredients, such as fillers, may be included but have not been found to be necessary.

Following are several example formulations illustrative of coating compositions that may be used as the undercoating 20 to promote the adherence of the superimposed ink-transfer coating 30 and to minimize the penetration of the ink to the backing medium 10:

*Example 1*

| | Parts by weight |
|---|---|
| Vinyl chloride resin | 50 |
| Di(2-ethylhexyl)adipate | 45 |
| Diethylene glycol dimethacrylate | 5 |

*Example 2*

| | |
|---|---|
| Vinyl chloride resin | 45 |
| Di(2-ethylhexyl)adipate | 45 |
| Diethylene glycol dimethacrylate | 8 |
| Dibasic lead phosphite | 2 |

*Example 3*

| | |
|---|---|
| Vinyl chloride resin | 53 |
| Di(2-ethylhexyl)adipate | 27 |
| Di(2-ethylhexyl)phthalate | 15 |
| Diethylene glycol dimethacrylate | 5 |

*Example 4*

| | |
|---|---|
| Vinyl chloride resin | 60 |
| Di(2-ethylhexyl)adipate | 40 |

*Example 5*

| | |
|---|---|
| Vinyl chloride resin | 53 |
| Di(2-ethylhexyl)adipate | 27 |
| Di(2-ethylhexyl)phthalate | 20 |

The undercoating composition, after thorough mixing to disperse the resin particles in the liquid vehicles, may be applied to the paper backing 10 by any suitable coating apparatus, such as by a doctoring roll in a reverse roll type of coating machine. The fluid composition is fused immediately after coating by heating it to a temperature sufficiently high for the solvent plasticizer to solvate the resin particles. Fusion may be accomplished by passing the coated paper over a roll heated to a temperature of about 175° C.–205° C., or by the use of infra-red lamps.

As mentioned earlier, the ink-transfer coating 30 is preferably of the type disclosed in my copending application Serial No. 598,753, illustrative formulations thereof being as follows:

*Example A*

| | Percent by wt. |
|---|---|
| Methyl ethyl ketone | 53.5 |
| Acrylic resin | 10.0 |
| Vinyl resin | 4.0 |
| Isopropyl palmitate | 5.0 |
| 91 oil (mineral) | 5.0 |
| Oleic acid | 1.0 |
| Alkali blue paste | 15.0 |
| Ultramarine blue | 6.0 |
| Bentonite | 0.5 |

Example B

| | |
|---|---|
| Methyl ethyl ketone | 54.0 |
| Toluol | 8.0 |
| Acrylic resin | 7.5 |
| Vinyl resin | 6.0 |
| Polystyrene (unmodified) | 2.0 |
| Latex emulsion | 0.5 |
| Peerless carbon black | 3.0 |
| Purple toner | 1.0 |
| Ambrex violet | 5.0 |
| Sperm oil (bodied) | 9.0 |
| Sperm oil (poly) | 3.0 |
| 91 oil (mineral) | 3.0 |

Example A is an ink-transfer coating composition useful in preparing pencil "carbon" paper. Example B is especially useful in preparing typewriter "carbon" paper in that it exhibits less undesirable offsetting during use, which is an especially important requirement for typewriter applications to minimize marks from the feed rolls.

In both of these examples, the acrylic resin is a soluble acrylic resin selected from the group consisting of polymers and copolymers of acrylic and methacrylic esters, preferably of the lower aliphatic alcohols, an eminently suitable resin being a copolymer of 85–90% methyl methacrylate and 10–15% ethyl acrylate. The vinyl resin is added to the composition to blend with the acrylic resin and contributes to increasing the pressure-sensitivity of the overall transfer coating and thereby the manifolding properties of the coated paper. Particularly useful resins are copolymers containing at least 80% vinyl chloride such as copolymers of 85–90% vinyl chloride and 10–15% vinyl acetate. Depending on the desired properties of the overall transfer coating, the vinyl resin may be included from a minimum of about one part per ten parts of the acrylic resin, up to a maximum of about one part per part of the acrylic resin for typewriter applications and about one-and-one-half parts of the acrylic resin for pencil applications. The remaining constituents in both examples are the plasticizing oils released from the resin base under the writing or impact pressure; the coloring matter carried by the plasticizing oils; modifiers of the transfer coating; and solvents to reduce the composition to coatable consistency.

With respect to Example A, the plasticizing oils include the organic ester isopropyl palmitate, the 91 oil (a mineral oil), the fatty acid oleic acid, and the naphthenic mineral oil which constitutes about 60% of the alkali blue paste. In Example B, the plasticizing oils include the 91 oil, the sperm oils (animal oils) and the mineral oil constituting about 60% of the ambrex violet. As disclosed in the above-mentioned application, these oils are merely illustrative examples of the substantially non-volatile, non-drying, liquid plasticizers selected from the incompatible or partially compatible, fatty acids, esters, animal, vegetable and mineral oils that may be used. Because of the wide variation of transfer characteristics that may be desired in pencil "carbon" paper of Example A, or in typewriter "carbon" paper of Example B, especially write-intensity, and because of the wide variation in plasticizing oils that may be selected, the amount of these oils can be varied over a broad range. The preferred ranges vary from about three-fourths part to about two-and-one-half parts, by weight, per part of the total resin content.

The coloring matter in both examples is preferably pigments with suitable toners. They should be selected for lower oil absorption properties and may be included in the composition over a broad range of proportions within workable coating viscosities. In Example A, the coloring matter is the alkali blue pigment which constitutes about 40% of the alkali blue paste. In Example B, the coloring matter is the carbon black, the purple toner, and the violet toner making up about 40% of the ambrex violet.

In Example B, it will be noted that the resin constituent also includes minor proportions of unmodified polystyrene and of a latex emulsion, the latter being about 33% of a natural rubber latex dispersed in about 67% water. These modifiers of the resin, as disclosed in the above-mentioned application, have been found to further reduce the undesirable offsetting characteristics of the coating and are especially useful in such coating compositions for typewriter "carbon" applications. Examples of such modifying ingredients which may be included are polystyrene and phenol formaldehyde resins, modified ester gums, and latex emulsions, and in general they may be included up to the limit of their compatibility with the other resins.

The foregoing ink-transfer compositions, as mentioned above, are applied in the form of a solvent solution and accordingly include the solvent methyl ethyl ketone (with or without diluents such as toluol) in sufficient amounts to reduce the compositions to coatable consistency. As noted above, when the compositions described herein are used as the undercoating, the solvent of the ink-transfer coating does not tend to dissolve the resin of the undercoating, the latter being insoluble, thus enhancing the barrier presented by the undercoating against the penetration of the ink.

As the ink-transfer compositions illustrated by Examples A and B do not per se form a part of the present invention, they are not described in detail herein, but reference may be had to my above-mentioned application Serial No. 598,753 for a more detailed description of such compositions.

The ink-transfer composition is applied to the undercoating 20 described above by any suitable coating techniques, after which the solvent is evaporated to produce the coating 30.

While the novel duplicating media have been herein described as utilizing an ink-transfer coating of the type disclosed in my application Serial No. 598,753, which is presently considered to be a preferred embodiment of the present invention, it will be understood that the invention itself is not so limited and that other transfer coatings operative under pressure to transfer ink or an impression could also be used. Other modifications, variations, and equivalents of the invention will be readily apparent to those skilled in the art and are intended to be included in the scope of the invention as defined in the following claims.

I claim:

1. A method of producing duplicating articles such as long-lasting carbon paper and the like comprising: applying to a surface of a paper backing member, capable of transmitting an impression, a coating composition comprising a polyvinyl chloride plastisol dispersion resin and a liquid vehicle therefor, said liquid vehicle being substantially free of volatile ingredients and including a substantially non-volatile solvent-type plasticizer for the resin, said plasticizer being present from about ½ to 1½ parts by weight per part of the resin; heating the composition to the fusing temperature to fuse the resin particles to the backing member; applying thereover a coating of an ink-transfer composition comprising a vinyl chloride resin and an acrylic resin selected from the group consisting of polymerized acrylic and methacrylic esters of lower aliphatic alcohols, a volatile solvent for said resins, coloring matter, and a nonvolatile nondrying color-carrier liquid expressible when subject to pressure from said synthetic resin when in solid form after removal of the solvent, said solvent being substantially a non-solvent for the polyvinyl chloride plastisol dispersion resin; and evaporating said solvent from the ink-transfer composition.

2. The method as defined in claim 1 wherein the liquid vehicle of said first-named coating composition also includes a heat polymerizable methacrylate diester of a liquid polyethylene glycol present up to about ⅓ part, by weight, per part of the polyvinyl chloride plastisol dispersion resin.

3. The method as defined in claim 1 wherein said acrylic resin comprises a copolymer of 85-90% methyl methacrylate with 10-15% ethyl acrylate and said vinyl chloride resin comprises a copolymer of 85-90% vinyl chloride with 10-15% vinyl acetate, said vinyl chloride resin being present from about 1 to 15 parts by weight per 10 parts of said acrylic resin.

4. A duplicating article produced by the method defined in claim 1.

References Cited in the file of this patent

UNITED STATES PATENTS

| | | |
|---|---|---|
| 2,372,209 | Kohler | Mar. 27, 1945 |
| 2,606,775 | Newman | Aug. 2, 1952 |
| 2,820,717 | Newman | Jan. 21, 1958 |

OTHER REFERENCES

"Modern Plastics," August 1947, pages 108-111.